United States Patent [19]

Killorin

[11] 4,232,657
[45] Nov. 11, 1980

[54] SYSTEM FOR USE WITH SOLAR COLLECTOR

[76] Inventor: Francis H. Killorin, P.O. Box 353, Snug Harbor, Duxbury, Mass. 02332

[21] Appl. No.: 31,534

[22] Filed: Apr. 19, 1979

[51] Int. Cl.³ .............................................. F24J 3/02
[52] U.S. Cl. ................................... 126/427; 126/422; 126/437; 126/435; 237/8 R; 165/DIG. 2; 219/297
[58] Field of Search .................. 126/419–423, 126/400, 437, 435, 427; 237/8 R, 2 B; 62/238 E, 324; 165/DIG. 2, 95; 34/86; 219/297

[56] References Cited

U.S. PATENT DOCUMENTS

| | | | |
|---|---|---|---|
| 3,299,881 | 1/1967 | Koch | 126/427 |
| 3,799,145 | 3/1974 | Butterfield | 126/427 |
| 4,037,786 | 7/1977 | Munroe | 165/DIG. 2 |
| 4,049,194 | 9/1977 | Tice et al. | 126/427 |
| 4,050,626 | 9/1977 | Awalt, Jr. | 126/427 |
| 4,052,001 | 10/1977 | Vogt | 126/427 |
| 4,131,231 | 12/1978 | Cleer, Jr. | 126/427 |
| 4,132,356 | 1/1979 | Ramer | 126/427 |
| 4,159,017 | 6/1979 | Novi | 126/427 |

FOREIGN PATENT DOCUMENTS 2712733 9/1978 Fed. Rep. of Germany ............ 126/427

Primary Examiner—James C. Yeung
Attorney, Agent, or Firm—Morse, Altman, Oates & Bello

[57] ABSTRACT

A system is provided for use with a solar collector. The system includes a water storage tank having a heat exchange element mounted therein, the tank being connected to one or more solar collectors adapted to heat water circulated through a primary loop by associated pumps. A secondary water loop connects to a heat exchanger at a waste heat supply source such as a furnace flue, for example, and provides supplementary heat to the water circulating in the primary loop. The storage tank forms part of a primary heat exchanger, the function of which is to provide means for heating water flowing through a coil in the tank for local use. A booster heater connected to the hot water outlet of the coil provides additional heat to the water during periods of high demand and/or poor conditions for heating water with the collector or the waste heat source. An automatic control system is provided for stopping and starting circulating pumps in response to temperature levels in the system detected by various temperature sensors. The heat exchanger coil is of a large capacity to provide an ample supply of preheated hot water. The tank itself is insulated by a hinged, pre-formed casing, which normally would be installed after the tank has been moved to its final location in order that the size and storage capacity of the tank may be maximized for retrofit.

7 Claims, 5 Drawing Figures

SYSTEM FOR USE WITH SOLAR COLLECTOR

BACKGROUND OF THE INVENTION

1. Field of the Invention

This invention relates generally to a water supply and control system for use with a solar collector, and more particularly is directed towards an automatically controlled system for use with a solar collector in which supplementary heat sources are provided for use as needed and as available. The system also includes a novel, high capacity water storage tank, heat exchanger unit and separable insulation.

2. Description of the Prior Art

With the increasing cost and scarcity of conventional energy sources, solar heating systems are being installed on an increasingly greater number of buildings, particularly homes. These systems are being used primarily as supplementary heating sources for hot water requirements. Typically, a solar heating system includes a solar collector, normally mounted on the roof of the building and oriented to face in a southerly direction for maximum exposure to the sun. A liquid is circulated by means of a pump through a closed loop which includes the collector and a variety of different liquids have been used for this purpose. Glycerine-based materials and similar antifreeze type liquids have been used for transferring the heat from the collector to storage means normally located in the basement of the building. Such storage means commonly have been relatively small, inadequately insulated tanks in which is disposed a heat exchanger coil connected to the collector and around which coil feed water is pumped and heated for subsequent use in the home.

While such systems are in common use, they do not provide a steady source of hot water and do not minimize standby heat loss. Further, dependent on the sun alone and inefficient in winter, they must rely upon the availability of conventional heaters.

Accordingly, it is an object of the present invention to provide improvements in solar water heating systems.

Another object of this invention is to provide a solar heating system for water adapted to provide a steady source of heated water, irrespective of fluctuations in the output of the collector.

A further object of this invention is to provide a solar collector system having auxiliary, non-solar heat sources with automatic, precision control over the operation of the system.

A still further object of this invention is to provide a new and improved combination heat exchanger and water storage tank for use in a solar heating system.

Yet another object of this invention is to maximize the storage capacity of the tank by the use of removable insulation which allows uninsulated tanks of optimum diameter to be conveniently transported and installed with insulation being applied after installation.

SUMMARY OF THE INVENTION

This invention features a system for use with a solar collector, comprising a water storage tank, a first loop for circulating storage or heat exchange water between the tank and the collector, a second loop for circulating storage or heat exchange water from the first loop to a waste heat source such as a furnace flue, pumps for selectively circulating water through the first and second loops, and temperature sensing elements operatively connected to various parts of the system for sensing the temperatures thereof. A control unit connects to the pumps and sensors and responds to the temperature sensors to selectively operate the pumps as needed. A heat exchange coil of large capacity is mounted within said tank for heating potable water for local use and a booster heater is connected to the hot water line to maintain a minimum temperature in the water in case of low temperature levels in the storage tank. The control unit automatically operates the booster heater.

This invention also features a combination hot water storage tank and heat exchanger, comprising an unpressurized tank for storing water heated by the collector and a relatively large, long coil of tubing mounted in the tank through which potable water for local use is circulated and heated. The coil has a capacity sufficient to provide normal needs for hot water uses such as bathing, showering, washing and the like. An insulating jacket comprised of two or more tank-shaped sections shipped as separate items are designed for installation about the tank after the tank has been delivered and mounted in position.

DETAILED DESCRIPTION OF THE PREFERRED EMBODIMENT

Figure 1:
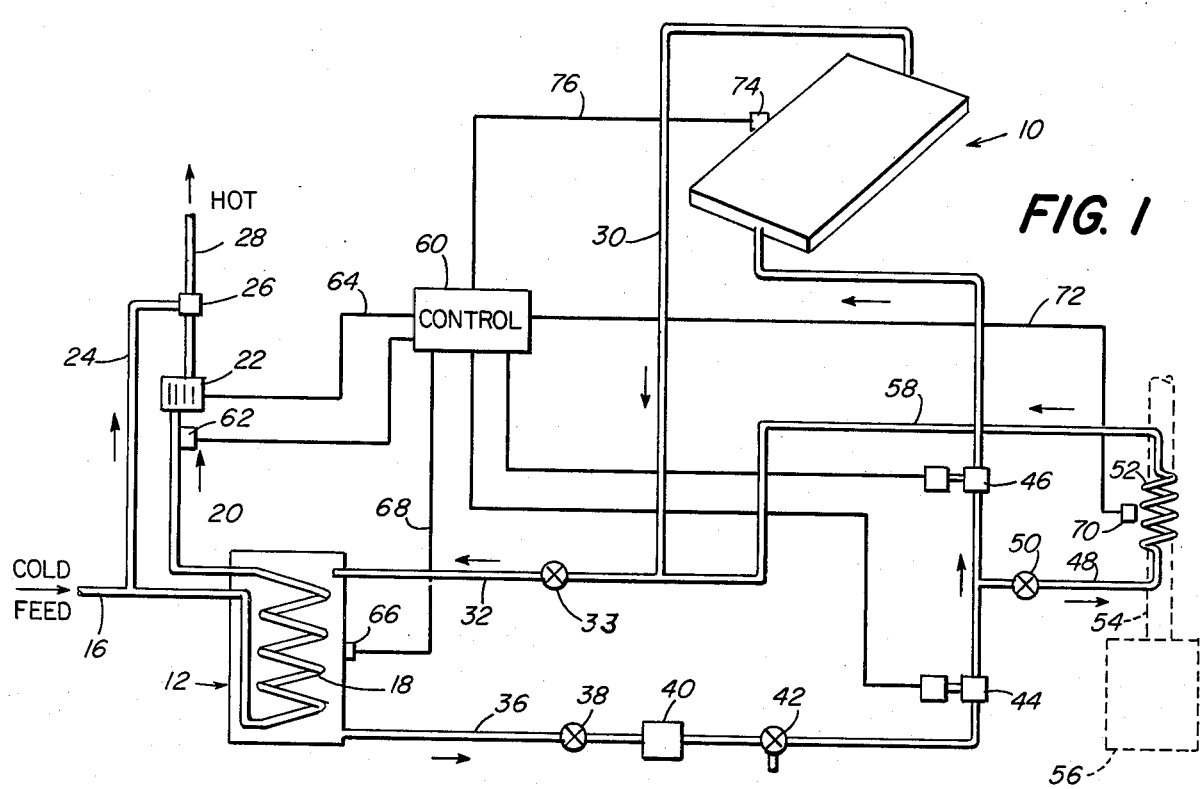
FIG. 1 is a schematic diagram of a solar collector water system and control system made according to the invention.

Referring now to the drawings, the system is generally organized about a solar collector 10 and a combination water storage tank and heat exchanger 12. In practice the collector 10 would be mounted outside the building which it will service and typically is installed on the roof of the building oriented in a southerly direction where it will be exposed to the maximum amount of sunlight. While only one solar collector is shown for the purposes of clarity, several collectors connected to the same system may be employed for a given installation, depending upon the hot water needs of the building. During the non-winter months, three or four collectors should be able to supply sufficient heated water to meet the needs of an average family.

The tank 12, in practice, is installed in the basement or lower floor of the building for the sake of convenience insofar as it is connected to the potable hot water service system for the building.

The system is generally divided into two separate, but interrelated liquid flow sub-systems connected to the tank 12. The first sub-system is the potable water service supply for the building in which cold water is fed through a heat exchange element in the tank 12 where it is heated by a storage water collected in the tank and then delivered as hot water for such service use as washing, bathing and the like and is shown on the left hand side of FIG. 1. On the right hand side is the sub-system involving the solar collector 10 which is comprised of a primary loop for the collector 10 and a secondary loop for a supplementary waste heat source providing an extra source of heat for the water in this sub-system.

The building service water system is comprised of a cold feed inlet line 16 extending into the tank 12 at the top thereof and running down to the base thereof to connect with a helical coil 18 mounted upright in the tank 12 and immersed in storage water in the tank. The temperature of potable water fed into the coil will be raised by storage water in the tank 12 which has been heated by the solar collector 10 or by waste heat. The feed water discharges from the top part of the coil into a hot water service line 20.

The line 20 is provided with a booster heating unit 22 adapted to raise the temperature in the line 20 in the event the temperature of the water in the tank is not sufficient to bring the water temperature in the line up to the desired level. Typically, household service water is heated to a range of about 115° to 120° F. and, from time to time, the water in the tank may be insufficient to heat the water in the line to this temperature range, or water may be drawn from the service system at a rate greater than usual so that the water in the coil does not have sufficient time to recover to the required temperature.

The hot water line is also connected by a branch line 24 to the cold feed line 16 through a mixing valve 26 which is adapted to reduce the temperature of the water going into the building's hot water service line 28 in the event that the temperature of the water coming out of the coil 18 is higher than the desired temperature. The mixing valve 26 will automatically add sufficient cold water to bring the temperature of the water in the line 28 down to the desired level.

In accordance with the invention, the coil 18 is relatively large in diameter and is quite long in order to hold a useful supply of hot water for the building. For this purpose the coil 18 is made up of 92 feet of 2" tubing which holds approximately 15 gallons of water which will be available for the building use. These dimensions are only by way of example and may be altered to suit particular installations. While the coil 18 may be fabricated from copper or other suitable metal, plastic tubing is less expensive and more easily fabricated. Thus, a suitable high temperature polyvinylchloride may be used to advantage in fabricating the coil 18. By using such a high capacity coil 18, a large reserve of hot water is kept available for meeting a single large demand of a tub or clothes washer, for example. Generally speaking, heavy demands of this type tend to be made after fairly long intervals so that the water temperature in the coil will recover after a large demand.

Figure 4:
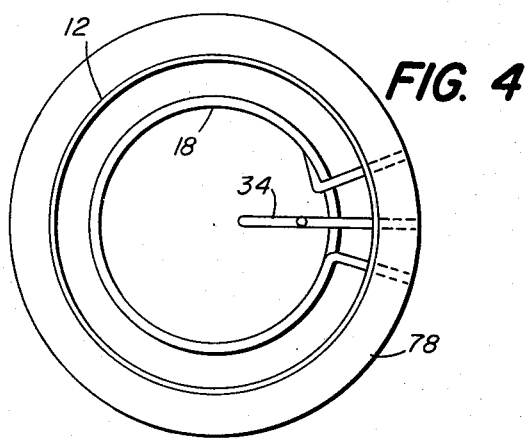
FIG. 4 is a top plan view thereof with the cover removed, and, FIG. 5 is a view in perspective showing the insulating jacket used on the tank of FIGS. 3 and 4.
Figure 3:
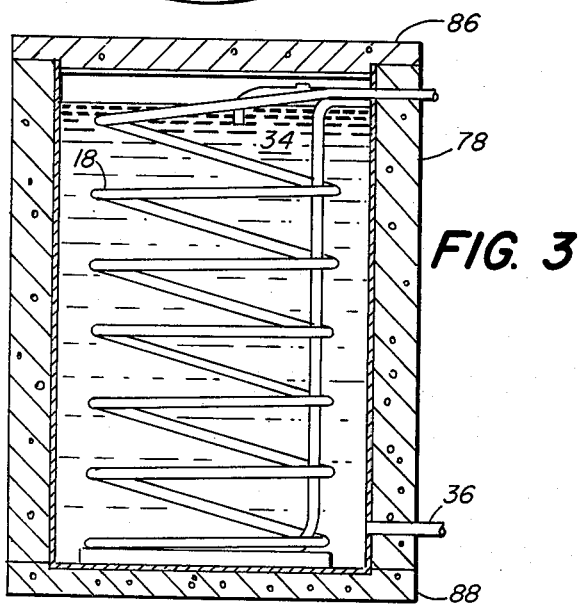
FIG. 3 is a sectional view in side elevation of a combination water storage tank and heat exchanger made according to the invention.
Figure 2:
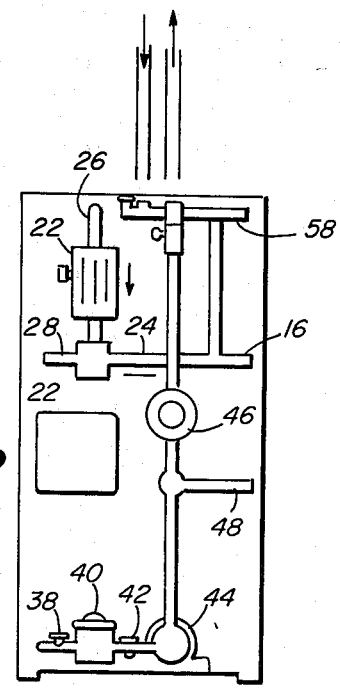
FIG. 2 is a view in front elevation showing certain components of the control panel used in the invention.

The solar heating side of the system includes a conduit 30 connected to the top of the collector 10 and draining downwardly to a line 32 provided with a flow control valve 33. The conduit 32 connects to the top of the tank 12 and terminates in a neck 34, as best shown in FIGS. 3 and 4. Water fed into the tank from the line 32 has been heated by the collector 10 or by the waste heat source and serves to heat water within the coil 18. Water fed into the top of the tank is at its maximum temperature and flows downwardly, counter to the upward flow of potable water in the coil 18.

A collector supply line 36 is connected to the bottom of the tank 12 and is provided with a shut-off valve 38, a filter 40 and a drain valve 42. The supply line 36 is also provided with a pair of pumps 44 and 46 which are independently operated for reasons that will presently appear. The upper end of the supply line 36 connects to the bottom of the solar collector 10, as shown. When both of the circulating pumps are running, water will circulate continuously through the primary loop between the collector 10 and the tank 12, heating water within the coil 18. Both pumps are located below the level of the storage water in the tank 12 so as to keep both pumps primed at all times.

The secondary loop is comprised of a conduit 48 connected to the supply line 36 and provided with check valve 50. The conduit 48 connects to the line 36 between the pumps 44 and 46. The conduit 48 is provided with a heat exchange coil 52 adapted to collect waste heat and, in the illustrated embodiment, this is achieved by mounting the coil 52 about a flue 54 for a furnace 56. Other waste heat sources might also be utilized. However, since most buildings are equipped with a furnace and much heat is lost through the flue, such flues are particularly useful sources of supplementary heat which would otherwise be wasted. From the coil 52 a conduit 58 connects to the line 32 which, as indicated previously, flows into the top of the tank 12.

In the preferred form of the invention, the upper pump 46 is larger than the lower pump 44 and, when the lower pump 44 is operating alone, its output is sufficient to produce a pressure head in the primary and secondary loops so as to pump only as high as the top of the furnace flue 54. Since the pump 46, when it is not running, acts as a resistance in the line, then water circulated by the lower pump 44 will be forced into the secondary loop through the waste heat recovery coil 52. In practice the pump 44 is turned on alone when the temperature of the water in the waste heat coil 52 is at least 20° higher than the temperature of the water in the tank 12.

The system is provided with a number of temperature sensing elements such as thermostatic switching devices connected to various parts of the system and to a central control unit 60. A temperature sensing element 62 is provided in the line 20 between the coil 18 and the booster unit 22. The sensor 62 is connected to the control unit 60 and, in the event that the temperature of the water coming out of the coil for the hot water service system is too low, (below 115° to 120° F. for example) the booster 22 would be energized through a lead 64 also connected to the control unit 60. Another temperature sensing element 66 is connected to the tank 12 to monitor the temperature of the water within the tank and is also connected to the control unit 60 by lead 68. A temperature sensing element 70 is connected to the waste heat coil 52 and connects to the control unit 60 by a lead 72.

A time delay heat sensing element 74 is connected to the solar collector 10 to monitor the temperature of the water flowing through the collector and is connected to the control unit 60 by a lead 76. The element 74 is of a time delay type to prevent frequent stop and start cycles of operation of the pumps which would otherwise occur. If the collector 10 has heated any water that may be within the collector to 20° above the temperature of the water in the tank 12, for example, both pumps are started, thereby introducing cold water to the collector. If the system is at rest, all water will have drain out of the collector. The chilling water coming into the collector, when it reaches the thermostat 74, would, with a conventional thermostat, cause the pumps to stop. To eliminate this problem, a time delay thermostat, having a delay characteristic of preferably about five minutes, is provided so that, once the pumps are started, they will run for at least five minutes, thereby allowing the initially cool water coming into the collector to heat up to a desired temperature level. Once water has started to circulate through the primary loop, pump 44 may be stopped since pump 46 will then be able to maintain circulation. Pump 44 may be stopped by means of a timing device connected to a switch controlling the operation of pump 44.

The system functions in a number of different modes depending upon various conditions. A summary of the modes is set forth below.

A. When the temperature of the water in the collector 10 is 20° higher than the water in the tank 12 and the water in the waste heat recovery unit 52 is not 20° higher than the water in the storage tank 12, both the lower pump 44 and the upper pump 46 are started. In this mode the sensors involved include the collector sensor 74, the waste heat temperature sensor 70 and the tank sensor 66.

B. After both pumps have started, the first surge of cold water passing through the collector 10 will cool off the collector for a brief period of time. The sensors 74 and 66 are involved in this mode and the time delay characteristic of the sensor 74 prevents the pumps from stopping for approximately five minutes to allow the temperature of the water coming into the collector to rise to a desired level.

C. After both pumps have operated for a period of perhaps three to seven minutes, the pump 44 is stopped, since the siphon effect in return line 30 will have reduced the load on the pumps.

D. Under conditions in which the temperature of the water in the collector 10 is not 20° higher than water in the tank 12, and the water in the waste heat coil 52 is 20° higher than the water in the tank 12, then the lower pump 44 only will be started, causing the water to circulate through the secondary loop only and not through primary loop. The waste heat from the furnace flue is thus transferred to the secondary loop and is used to heat the water in the tank 12. Under these conditions the temperature sensing elements 74, 70 and 66 are involved.

E. In the event that the temperature of the water in the collector 10 is 20° higher than the water in the tank 12 and the temperature in the waste heat coil 52 is 20° higher than the water in the storage tank 12, then the lower pump 44 only will start and the same conditions prevail as in the previous mode.

When water is flowing through the booster unit 22 the unit 22 will be energized if the temperature of the water in the tank 12 is less than 100° F. However, if the temperature of the water in the tank 12 is above 100° F. the booster 22 would not normally be energized.

When both pumps 44 and 46 have stopped, all of the water in the upper part of the system drains down into the tank 12, thereby preventing the water from freezing in the winter. In order to ensure complete drainage of all lines and collectors, there should be a slight downward incline on all lines including any manifolds in the collector.

In the event that higher or lower temperatures in the hot water service line are desired, the various temperature sensing elements may be adjusted or replaced to provide different temperature levels, as desired.

The tank 12 may take any one of a variety of configuration such as oval, rectangular or cylindrical, for example, and may be made from a number of different materials. However, it has been found that a satisfactory, low cost and efficient tank 12 may be provided by cylindrical or oval drum made from sheet steel. The interior surfaces of the tank preferably are treated to prevent rusting and, in practice, a coating of an appropriate high temperature plastic has been found to provide satisfactory results. The size of the tank will depend upon the capacity of the system. In practice, if the system is connected to two collectors of 40 square feet each, a 90 gallon tank is sufficient. For each additional collector the tank capacity should be increased by another 30 gallons.

Figure 5:
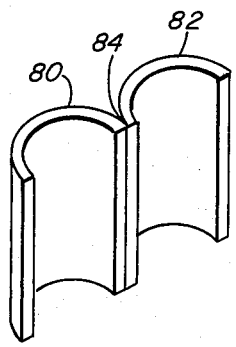

In order to conserve as much heat as possible within the tank, the tank is highly insulated. In accordance with the invention an outer insulating jacket 78 is provided for the tank. The jacket 78, as best shown in FIG. 5, is comprised of a pair of semi-cylindrical sections 80 and 82 which may be hinged together along a hinge line 84 lengthwise of the jacket. The jacket is made to fit snugly about the tank 12 and, in practice, is shipped as a separate item for installation at the site where the system is being installed. The jacket is relatively thick and, by providing it as a separate item, it is possible to use a tank 12 that is of a maximum diameter commensurate with standard doorway openings. Thus, a maximum sized tank can be moved into a home through a conventional doorway and, once the tank is in place, the jacket is quickly and easily installed by closing it over the outside of the tank. The free ends of the sections 80 and 82 may be joined by a strip of pressure sensitive adhesive tape or other fastening means. The top and bottom of the tank may also be insulated by means of circular covers 86 and 88 which also may be installed at the site.

The jacket may be fabricated from a variety of different insulating materials such as extruded foamed polystyrene, for example. A variety of insulating paper-based materials may also be used to advantage for this purpose.

While the invention has been described with particular reference to the illustrated embodiment, numerous modifications thereto will appear to those skilled in the art. For example, while a single solar collector has been shown, obviously two or more collectors may be added to the system in a typical installation. The collector itself may be any one of a variety of different commerically available collectors and preferably should be relatively light in weight, efficient and easily installed. Various types of heat exchanging devices may be used for the waste heat recover unit, and, while a simple coil 52 has been shown, other configurations are possible. For example, the exchanger could comprise a heat absorbing sheet of metal with flattened tubes preformed into it. The sheet may be curved to wrap around and contact the flue with the entire assembly suitably insulated with fibreglass, for example. Light adjustable springs may be provided to keep the heat exchanger in good thermal contact with the flue pipe. A stronger, bi-metal spring may be interposed to move the exchanger out of direct contact with the flue pipe in the event that the flue temperature becomes too high.

Having thus described the invention, what I claim and desire to obtain by Letters Patent of the United States is:

1. A system for use with a solar collector, comprising
 (a) a combination storage tank and a heat exchanger, (b) first conduit means connected between said tank and said collector and defining a primary circulating loop,
(c) second conduit means connected between said primary loop and a waste heat source, and defining a secondary circulating loop,
(d) a liquid heat exchange medium in said loops,
(e) a pair of pumps operatively connected to said primary loop for circulating said medium selectively through said primary and secondary loops,
(f) pump control means connected to said pumps for selective operation thereof,
(g) one of said pumps being located ahead of said secondary loop and having a pumping capacity when operated alone to circulate said medium only through said secondary loop, and,
(h) third conduit means connected to said heat exchanger and defining a separate flow path for feed water therethrough to be heated thereby to provide hot water service.

2. A system according to claim 1 including independent heating means operatively connected to said third conduit means for independently raising the temperature of the water in said third conduit means to a predetermined level.

3. A system according to claim 2 including a mixing valve in said third conduit means connected to a source of cold feed water for reducing the temperature of the water in said third conduit means to a predetermined level.

4. A system according to claim 1 wherein said pump control means includes a time delay temperature sensing device operatively connected to said collector for maintaining the operation of said pumps for a minimum period of time once said pumps have been started.

5. A system according to claim 1 wherein said heat exchanger includes a tank forming part of the flow path for said primary loop and a tubular coil mounted in said tank and forming part of the flow path for said third conduit means.

6. A system according to claim 5 wherein said tank includes a removable outer thermal insulating jacket comprised of at least a pair of tank-forming portions.

7. A system according to claim 6 wherein said portions are hinged together.

* * * * *